(12) United States Patent
Hou et al.

(10) Patent No.: US 8,817,667 B2
(45) Date of Patent: Aug. 26, 2014

(54) METHOD AND DEVICE FOR IMPLEMENTING GROUP INTELLIGENT SERVICE OF MOBILE VIRTUAL PRIVATE NETWORK

(75) Inventors: Zhirong Hou, Shenzhen (CN); Song Zheng, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 249 days.

(21) Appl. No.: 13/322,900

(22) PCT Filed: Sep. 4, 2009

(86) PCT No.: PCT/CN2009/073754
§ 371 (c)(1),
(2), (4) Date: Feb. 8, 2012

(87) PCT Pub. No.: WO2010/135877
PCT Pub. Date: Dec. 2, 2010

(65) Prior Publication Data
US 2012/0127896 A1    May 24, 2012

(30) Foreign Application Priority Data

May 26, 2009   (CN) .......................... 2009 1 0143467

(51) Int. Cl.
*H04L 12/16* (2006.01)
(52) U.S. Cl.
USPC ........................................................ 370/259
(58) Field of Classification Search
USPC ............. 370/259, 260, 261, 328; 379/201.01; 455/422.1, 433
See application file for complete search history.

(56) References Cited

U.S. PATENT DOCUMENTS

| 6,243,453 B1 * | 6/2001 | Bunch et al. ............. 379/201.01 |
| 6,463,141 B1 | 10/2002 | Tuunanen et al. |
| 6,876,632 B1 * | 4/2005 | Takeda .......................... 370/259 |
| 6,999,781 B1 * | 2/2006 | Wallenius ..................... 455/466 |
| 2002/0049902 A1 * | 4/2002 | Rhodes ......................... 713/153 |
| 2002/0106064 A1 * | 8/2002 | Bekkevold et al. ........ 379/114.2 |

(Continued)

FOREIGN PATENT DOCUMENTS

| CN | 1467977 A | 1/2004 |
| CN | 1780338 A | 5/2006 |

(Continued)

OTHER PUBLICATIONS

Machine Translation of CN 1780338 A.*

(Continued)

*Primary Examiner* — Paul H Masur
(74) *Attorney, Agent, or Firm* — Knobbe, Martens, Olson & Bear, LLP

(57) ABSTRACT

A method for implementing group intelligent service of a Mobile Virtual Private Network (MVPN) includes: configuring on a Service Management Point (SMP) a corresponding relationship between a group's number and a module number of the Service Control Point (SCP) on which the group is distributed, and configuring relevant data information of the group in the service database of each SCP on which the group is distributed; uniformly managing relevant data information of the group distributed on different SCP; performing the judging, the controlling and the billing for a call when a user triggers a service. A device for implementing group intelligent service of Mobile Virtual Private Network (MVPN) includes a configuration module, a management module and a service execution module.

15 Claims, 11 Drawing Sheets

(56) References Cited

U.S. PATENT DOCUMENTS

| | | | |
|---|---|---|---|
| 2003/0172356 A1* | 9/2003 | Pulkkinen et al. | 715/526 |
| 2004/0157605 A1* | 8/2004 | Nieminen et al. | 455/435.1 |
| 2005/0105706 A1* | 5/2005 | Kokkinen | 379/201.01 |
| 2008/0273681 A1* | 11/2008 | Song et al. | 379/201.01 |
| 2010/0062762 A1 | 3/2010 | Muratore et al. | |

FOREIGN PATENT DOCUMENTS

| | | |
|---|---|---|
| CN | 1306771 C | 3/2007 |
| CN | 101621748 A | 1/2010 |
| KR | 20010075927 A | 8/2001 |
| WO | WO 99/53696 A2 | 10/1999 |
| WO | WO 2006/114113 A1 | 11/2006 |

OTHER PUBLICATIONS

International Search Report mailed Mar. 4, 2010, for International Application No. PCT/CN2009/073754.

* cited by examiner

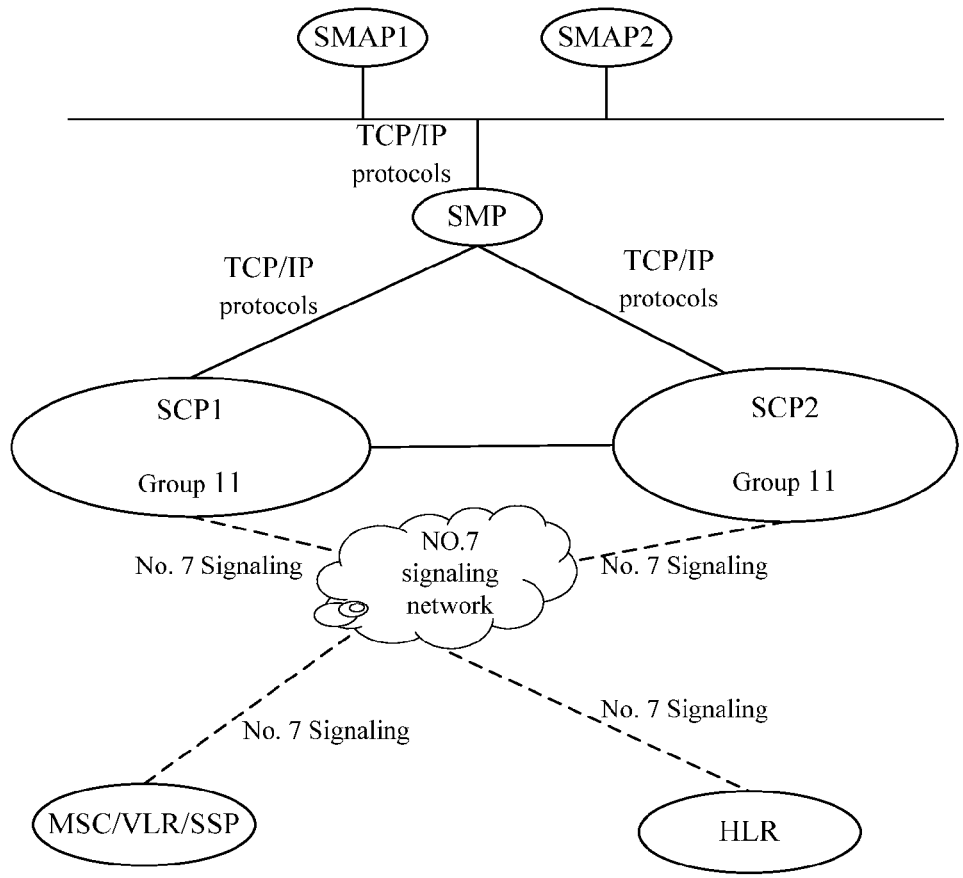

Fig. 1

| Group's number | module number of the SCP on which the group is distributed |
|---|---|
| Group 11 | module number of SCP1 on which the group is distributed is 135<br>module number of SCP2 on which the group is distributed is 136 |
| Group 12 | module number of SCP1 on which the group is distributed is 135<br>module number of SCP2 on which the group is distributed is 136<br>module number of SCP3 on which the group is distributed is 137<br>module number of SCP4 on which the group is distributed is 138 |
| Group 13 | module number of SCP1 on which the group is distributed is 135<br>module number of SCP4 on which the group is distributed is 138 |

Fig. 2

METHOD AND DEVICE FOR IMPLEMENTING GROUP INTELLIGENT SERVICE OF MOBILE VIRTUAL PRIVATE NETWORK

CROSS-REFERENCE TO RELATED APPLICATIONS

This application is the U.S. National Phase application under 35 U.S.C. §371 of International Application PCT/CN2009/073754 filed Sep. 4, 2009, which claims priority to Chinese Application 200910143467.0 filed May 26, 2009.

FIELD OF THE INVENTION

The present invention relates to the field of mobile intelligent network technology, particularly to a method and a device for implementing group intelligent service of a mobile virtual private network (hereinafter referred to as MVPN).

DESCRIPTION OF THE RELATED ART

The mobile intelligent network system, as an emerging service network for services in the mobile communication industry, is one of the main service growth point for telecommunication operators, which can provide numerous value-added services in a convenient, flexible, economical and efficient manner and provide users with more timely and humanized services with higher qualities by integrating with the business system, the customer service center, the short message center and the banking system.

The MVPN group service is a very widely used intelligent network service. This service targets at group users, for example, enterprises, organizations, schools, hospitals, governmental agencies and the like. After the group users apply for this service, a scheme for numbering internal short numbers is made according to the characteristics of this group for memory and management. A short number can uniquely identify a group member inside the group. Taking group users of an enterprise as an example, a short number can comprise the information such as position and staff number, when the real number of a group member changes, the real number can be modified by means of deleting or re-adding the group member without affecting the numbering scheme of the short number. In this way, the working connections between the staffs inside the group will not be influenced by the changes of real number in mobile communication terminals, and a user in the group can find his targeted user as long as he can remember the short number in the group.

The calls can be classified in details by the MVPN group service based on information of the calls, for instance, a call within a group is called as an on-net call. One or more groups with small units also can be established in a group to form a closed user group, wherein the call occurring in the closed user group is called as on-net closed user group call. Some significant off-net users can also be provided by this group to form a off-net number set, when a user in the group calls a user in the off-net number set, the call is called as off-net number set call. The service can gives different preferences to the on-net call, the on-net closed user group call, the off-net number set call and the general off-net call according to different call types, thereby reducing the communication expenses of the group using this service. For the operators, this service attracts large numbers of group clients, thus may realize preferable benefits. Therefore, this service reduces the communication expenses of the group and it is convenient for the staff in this group to use this service, and it also can enable the operators to attract large numbers of group clients, which preferably realizes their benefits. Such characteristics make this service become widely used.

At present, in implementing the MVPN group service, one MVPN group can only belong to one Service Control Point (called as SCP for short). However, with the development of economy, the number of group users who need this service, such as social enterprises and organizations, has been rapidly developed. With the emergence of large numbers of cross-provincial and even international groups, it is an inevitable trend for expanding the group user in the area. Therefore, the situation where one group user is only distributed on one SCP cannot fulfill actual demands.

Moreover, as the virtual group service develops, many original intelligent network devices cannot satisfy requirements for service development and it is in urgent need of expansion, so that a problem of how to make full use of the existing intelligent devices is presented, and the problem is an urgent problem to be solved in this field.

SUMMARY OF THE INVENTION

The technical problem to be solved in the present invention is the problem that the demand of developing the virtual group services can not be satisfied because in relevant technologies the MVPN group can only belong to one SCP. To this end, a solution for implementing group intelligent service of a mobile virtual private network is disclosed to provide cross-SCP VPN group users with all service features that non-cross-SPC VPN group users have.

The technical solution of the present invention is a method for implementing intelligent group service of a mobile virtual private network, comprising: configuring on a service management point, SMP, a corresponding relationship between a group's number and module number of service control points, SCPs, on which the group is distributed, and configuring relevant data information of the group in a service database of each SCP on which the group is distributed;
  uniformly managing relevant data information of the group distributed on different SCPs;
  performing the judging, the controlling, and the billing for a call when a user triggers a intelligent service.

The step of uniformly managing the relevant data information of the group distributed on different SCPs comprises: updating and synchronizing the relevant data information of the group on the SCP on which the group is distributed when the relevant data information of the group is changed; wherein said relevant data information of the group comprises group's information and information of group members.

The step of updating and synchronizing the relevant data information of the group on the SCP on which the group is distributed comprises: sending instructions to relevant SCP successively by said SMP according to the module number of the SCPs on which the group is distributed or via an interface machine, updating said relevant data information of the group in a local database after said instructions are received by said relevant SCP; the step of updating said relevant data information of the group at least comprises one of the following: establishing and deleting a group, adding and deleting a group member, setting and modifying a short number of a group member, setting and modifying a calling authority of a group member.

The process for performing the judging, the controlling and the billing for the call runs through a calling procedure, a called procedure and a forwarding procedure.

As a preferred technical solution, the calling procedure in the method for implementing group intelligent service of a mobile virtual private network comprises:

when a SCP receives a call, judging whether the calling user belongs to said SCP, if said calling user belongs to said SCP, then further judging whether the called user and said calling user are in the same group, if yes, performing billing control and preferential billing according to account balance of said calling user and type of the call, otherwise, performing billing control and non-preferential billing according to the account balance of said calling user and the type of the call; if said calling user does not belong to said SCP, then directly transferring said call to MSC for processing, and no longer performing call control and call billing;

said called procedure comprises:

when a SCP receives a call, judging whether the called user belongs to said SCP, if said called user belongs to said SCP, then further judging whether said called user and the calling user are in the same group, if yes, performing billing control and preferential billing according to account balance of said called user and type of the call, otherwise performing billing control and non-preferential billing according to the account balance of said called user and the type of the call; if said called user does not belong to said SCP, then directly transferring the call to MSC for processing, and no longer performing call control and call billing;

said forwarding procedure comprises:

when a SCP receives a call, judging whether the forwarding user belongs to said SCP, if said forwarding user belongs to said SCP, then further judging whether said forwarding user and the forwarded user are in the same group, if yes, performing billing control and preferential billing according to account balance of said forwarding user and type of the call, otherwise performing billing control and non-preferential billing according to the account balance of said forwarding user and the type of the call; if said forwarding user does not belong to said SCP, then directly transferring said call to MSC for processing, and is no longer performing call control and call billing.

As another preferred technical solution, the method for implementing group intelligent service of a mobile virtual private network adds one field comprising information of an off-net number set corresponding to said group is added to said group's information, said calling procedure comprises the following steps:

when a SCP receives a call, judging whether the calling user belongs to this SCP, if said calling user belongs to this SCP, then further judging whether the called user and said calling user are in the same group, if yes, performing first-stage preferential billing according to account balance of said calling user and type of the call, otherwise further judging whether said called user belongs to the off-net number set of the group which said calling user belongs to, if yes, performing second-stage preferential billing according to the account balance of said calling user and the type of the call, otherwise performing third-stage preferential billing according to the account balance of said calling user and the type of the call; if said calling user does not belong to this SCP, then directly transferring said call to MSC for processing, and no longer performing call control and call billing;

said called procedure comprises the following steps:

when a SCP receives a call, judging whether the called user belongs to this SCP, if said called user belongs to said SCP, then further judging whether said called user and the calling user are in the same group, if yes, then performing first-stage preferential billing according to account balance of said called user and type of the call, otherwise further judging whether said calling user belongs to the off-net number set of the group which said called user belongs to, if yes, performing second-stage preferential billing according to the account balance of said called user and the type of the call, otherwise performing third-stage preferential billing according to the account balance of said called user and the type of the call; if said called user doesn't belong to said SCP, then directly transferring said call to MSC for processing, and no longer performing call control and call billing;

said forwarding procedure comprises:

when a SCP receives a call, judging whether the forwarding user belongs to this SCP, if said forwarding user belongs to said SCP, then further judging whether said forwarding user and the forwarded user are in the same group, if yes, performing first-stage preferential billing according to account balance of said forwarding user and type of the call, otherwise further judging whether said forwarded user belongs to the off-net number set, if yes, performing second-stage preferential billing according to the account balance of said forwarding user and the type of the call, otherwise performing third-stage preferential billing according to the account balance of said forwarding user and the type of the call; if said forwarding user does not belong to said SCP, then directly transferring the call to MSC for processing, and no longer performing call control and call billing.

As another preferred technical solution, the method for implementing group intelligent service of a mobile virtual private network adds one field comprising information of on-net closed user set corresponding to said group is added to said group's information, said calling procedure comprises the following steps:

when a SCP receives a call, judging whether the calling user belongs to this SCP, if said calling user belongs to said SCP, then further judging whether the called user and said calling user are in the same group, if yes, then further judging whether said calling user and said called user are in the same on-net closed user set, if yes, performing first-stage preferential billing according to account balance of said calling user and type of the call, otherwise performing second-stage preferential billing according to the account balance of said calling user and the type of the call; otherwise performing third-stage preferential billing according to the account balance of said calling user and the type of the call; if said calling user doesn't belong to said SCP, then directly transferring the call to MSC for processing, and no longer performing call control and call billing;

said called procedure comprises:

when a SCP receives a call, judging whether the called user belongs to this SCP, if said called user belongs to said SCP, then further judging whether said called user and the calling user are in the same group, if yes, then further judging whether said calling user and said called user are in the same on-net closed user set, if yes, then performing first-stage preferential billing according to account balance of said called user and type of the call, otherwise performing second-stage preferential billing according to the account balance of said called user and the type of the call; otherwise performing third-stage preferential billing according to the account balance of said called user and the type of the call; if said called user doesn't belong to said SCP, then directly transferring the call to MSC for processing, and no longer performing call control and call billing;

said forwarding procedure comprises:

when a SCP receives a call, judging whether the forwarding user belongs to this SCP, if said forwarding user belongs to said SCP, then further judging whether said forwarding user and the forwarded user are in the same group, if yes, further judging whether said forwarding user and said forwarded user are in the same on-net closed user set, if yes, performing first-stage preferential billing according to account balance of said forwarding user and type of the call, otherwise performing second-stage preferential billing according to the account balance of said forwarding user and the type of the call; otherwise performing third-stage preferential billing according to the account balance of said forwarding user and the type of the call; if said forwarding user doesn't belong to said SCP, then directly transferring the call to MSC for processing, and no longer performing call control and call billing.

A device for implementing group intelligent service of a mobile virtual private network is further provided in the present invention, comprising:

a configuration module, configured to configure on a SMP a corresponding relationship between a group's number and module number of service control points, SCPs, on which said group is distributed, and configure relevant data information of said group in a service database of each SCP on which said group is distributed;

a management module, configured to uniformly manage relevant data information of said group distributed on different SCPs;

a service execution module, configured to perform the judging, the controlling, and the billing for a call when a user triggers a intelligent service.

The step of uniformly managing the relevant data information of said group distributed on different SCPs comprises updating and synchronizing said relevant data information of said group on said SCP on which said group is distributed when said relevant data information of said group is changed; said relevant data information of said group comprises: group's information and information of group members.

Said service execution module comprises a calling execution module, a called execution module and an forwarding execution module.

With an adoption of the aforesaid technical solution, the present invention comprises at least the following advantages:

in the method and device for implementing group intelligent service of a mobile virtual private network of the present invention, configuring on a SMP a corresponding relationship between a group's number and module number of the SCPs on which the group is distributed, configuring relevant data information of the group in the service database of each SCP on which the group is distributed, and uniformly managing relevant data information of the group distributed on different SCPs. Once relevant data information of the group is changed, relevant data information of the group on all SCPs on which the group is distributed can be updated and synchronized, thus providing cross-SCP VPN group users with all service features that non-cross-SPC VPN group users have. By adopting the technical solution of the present invention, not only existing intelligent network devices are fully utilized, which lowers hardware cost, but also it is very flexible and convenient to manage and maintain relevant data information of the group.

BRIEF DESCRIPTION OF THE DRAWINGS

FIG. 1 is a schematic diagram of establishing a mobile virtual private network in the first embodiment of the present invention;

FIG. 2 is a view illustrating a corresponding relationship configured on a SCP between a group's number and module numbers of SCP according to an embodiment of the present invention;

DETAILED DESCRIPTION OF THE EMBODIMENTS

Functional Overview

Figure 3:
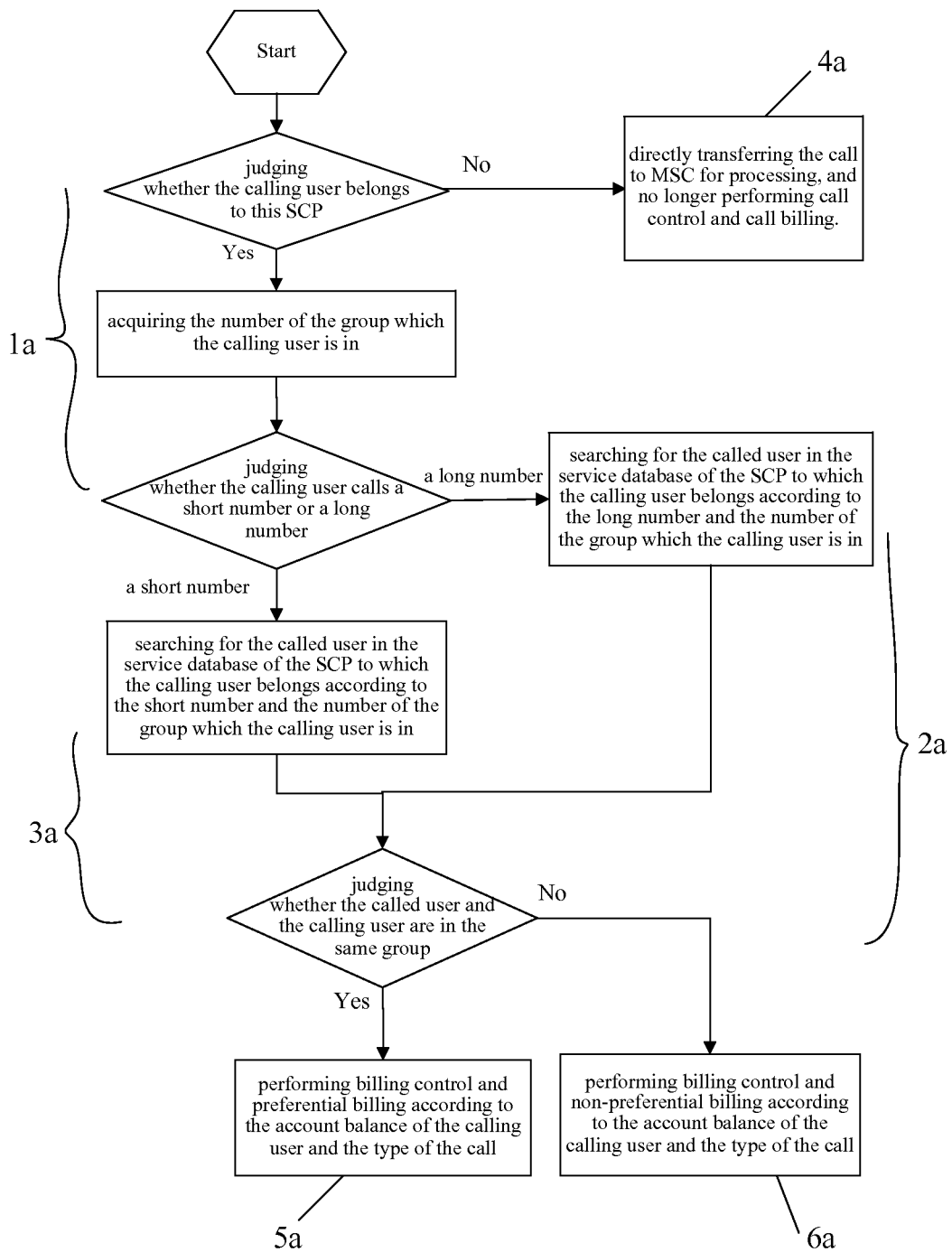
FIG. 3 is a flow diagram of the calling in the first embodiment of the present invention.

Considering the problem that the demand of developing the virtual group services can not be satisfied because in relevant technologies the MVPN group can only belong to one SCP, a solution for implementing the group intelligent service of a mobile virtual private network is provided in the embodiment of the present invention. Processing principles of this solution are as follows: configuring a corresponding relationship on a SMP between a group's number and module number of SCP(s) on which the group is distributed, and configuring relevant data information of the group in a service database of each SCP on which the group is distributed; uniformly managing relevant data information of the group distributed on different SCPs; performing the judging, the control, and the billing for a call when a user triggers a intelligent service.

It should be noted that, in the situation that no conflicts occur, the embodiments and the characteristics thereof in this application can be combined with each other. Hereinafter the present invention will be described in details with reference to the accompanying drawings.

In the following embodiments, the steps shown in the flow diagrams of the accompanying drawings can be executed in a computer system, such as a group of commands that computers can execute. Although the logic sequence is shown in the flow diagrams, the steps shown or described can be executed in a sequence different from the sequence shown here under some circumstances.

In order to further depict the technical scheme or utility adopted in the present invention to realize desired purposes, the method and device for implementing group intelligent service of a mobile virtual private network proposed in the present invention will be described in details as follows in combination with the accompanying drawings and preferred embodiments.

FIG. 1 is a schematic diagram of establishing the MVPN in the first embodiment of the present invention, as shown in FIG. 1, SMP and Service Management Access Point (called as SMAP for short), SMP and SCP are intercommunicated via TCP/IP protocols. The SCP, Mobile Switching Center (called as MSC for short) or Visitor Location Register (called as VLR for short) or Service Switching Point (called as SSP for short), Home Location Register (called as HLR for short) are interconnected via No. 7 signaling network, wherein the first Service Control Point SCP1 and the second Service Control Point SCP2 are connected via No. 7 signaling network and TCP/IP network. A unique group's number is assigned for each group in the MVPN, and each service in the mobile communication will be implemented on each SCP on which a group of the cross-SCP MVPN is distributed.

Group 11 in FIG. 1 is distributed on the first Service Control Point SCP1 and the second Service Control Point SCP2 and the services are loaded on both service control points respectively. The number of group 11 is the same in the SCP on which the group is distributed. The service run on first Service Control Point SCP1 and second Service Control Point SCP2 is managed by SMP through SMAP. The function for switching service is realized by MSC or VLR, and the subscription information of mobile users or group members are stored and managed by HLR. After it is judged that a user belongs to a group of this SCP, the user can be regarded as a group member of this group.

The method for implementing group intelligent service of a mobile virtual private network in the present embodiment comprises the following steps:

Step one, configuring on a SMP a corresponding relationship between a group's number and module number of SCP(s) on which this group is distributed, and configuring relevant data information of the group in a service database of each SCP on which the group is distributed.

Specifically, FIG. 2 is a view illustrating a corresponding relationship configured on a SMP between a group's number and the module number of SCP(s), as shown in FIG. 2, the corresponding relationship between a group's number and the module number of SCP(s) is configured on a SMP, each SCP has a unique module number of SCP, and the module number of SCP corresponds to the IP address of the SCP. The module number of SCP1 is 135, and the module number of SCP2 is 136. After the module number of SCP(s) is known, unused SCP can be distinguished by SMP through the module number of SCP(s), and the data on the SCP is operated by TCP/IP protocols, so as to achieve the uniform management for relevant data information of the group on each SCP.

Relevant data information of a group on all SCPs on which the group is distributed is written in the service database of each SCP on which the group is distributed, the relevant data information of the group comprises: group's information and user's information, wherein the user's information comprises: long number and short number of the group member(s), call authority of the group member(s) and the belonging information of the group member(s) to the SCP.

As for a specific SCP, group members can be divided into two kinds: the first kind of group members belong to this SCP, that is, this group members subscribe for a VPN intelligent service, and will trigger the VPN intelligent service of this SCP; the second kind of group members don't belong to this SCP and will not trigger the VPN intelligent service to this SCP, therefore it is needed to indicate the belonging information of the group members to SCP in the user information table of the SCP's service database so as to distinguish these two kinds of group members.

Step two, SMP uniformly manages the relevant data information of the group on a SCP on which the group is distributed.

To be specific, when the group's information and the information of the group members are changed, the SMP needs to update and synchronize the relevant data information of the group on the SCP on which the group is distributed, the information of group members comprising: the long number and short number of group members, the call authority of group members and the belonging information of group members to the SCP.

The step of updating and synchronizing the relevant data information of the group on the SCP on which the group is distributed comprises: the SMP successively sends instructions to the SCPs on which the group is distributed according to the module number of the SCP(s) on which the group is distributed, after receiving the instructions, the SCP updates relevant data information of the group in the local database. The step of updating for relevant data information of the group at least comprises one of the following: establishing and deleting a group, adding and deleting a group member, setting and modifying short number of group member, setting and modifying call authority of group member. It should be noted that as each group member has a unique long number, if it is needed to set and modify the long number of the group member, it is equivalent to add and delete the group member.

To this end, the SMP needs to define the following interfaces for the SCP by TCP/IP protocols:

1. interface used for adding the group, namely the group adding interface, and the instructions to be sent through this interface comprises the following basic fields:
   group's number,
   module number of the SCP(s) on which the group is distributed;
2. interface used for deleting the group, namely the group deleting interface, the instructions to be sent through this interface comprises the following basic fields:
   group's number,
   module number of the SCP(s) on which the group is distributed;
3. interface used for adding the group member, namely the group member adding interface, and the instructions to be sent through this interface comprise the following basic fields:
   group's number,
   long number of the group member,
   short number of the group member,
   call authority of group member,
   module number of the SCP(s) to which the group member belong,
   module numbers of the SCP(s) on which the group is distributed;
4. interface used for deleting the group member, namely the group member deleting interface, and the instructions to be sent through this interface comprise the following basic fields:
   group's number,
   long number of the member user,
   module number of the SCP(s) on which the group is distributed;

5. interface used for setting or modifying the short number of the group member, namely the short number modifying interface, the instructions to be sent through this interface comprises the following basic field:
   group's number,
   long number of the group member,
   new short number of the group member,
   module number of the SCP(s) on which the group is distributed;
6. interface used for setting or modifying the call authority of the group member, namely the call authority modifying interface, the instructions to be sent through this interface comprises the following basic field:
   group's number,
   long number of the group member,
   new call authority of the group member,
   module number of the SCP(s) on which the group is distributed.

Taking adding group member as an example, the process of uniformly managing by the SMP the SCP on which the group is distributed is described. The group managing operator initiates, via the first Service Management Access Point SMAP1, an operation of adding a group member with a long number of 8613905190600 to group 11, specifies the short number as 61001 and makes the call authority as on-net call, and this group member belongs to SCP1 with a module number of 135.

The SMP inquires the configuration information in the local database and acquires that group 11 is distributed on SCP1 with a module number of 135 and SCP2 with a module number of 137. After receiving from SMAP1 the group's number, the long number and short number and call authority of group member(s), the belonging information of group members to the SCP and the information of the SCP on which the group is distributed, the SMP successively sends instructions to the group member adding interfaces of SCP1 and SCP2 according to the information of the SCP on which the group is distributed, the instructions comprising field information such as the group's number, the long number and short number of group members, the call authority of the group member, the module number of SCP to which the group member belong and the module number of SCP on which the group is distributed.

Then, the SCP1 and the SCP2 add the information of the group's number, the long number and short number of the group member and the call authority to the local service database, the group members are set on SCP1 to belong to the SCP, while the group members are set on SCP2 to not belong to the SCP.

Preferably, an interface machine can be mounted between SMP and SCP, SMP and the interface machine, the interface machine and SCP are each intercommunicated via TCP/IP protocols. SMP can define on the interface machine through TCP/IP protocol six interfaces such as the group adding interface, the group deleting interface, the group member adding interface, the group member deleting interface, the short number modifying interface and the call authority modifying interface and the basic fields comprised when the interfaces are used. Relevant information of the changed group is sent to the interface machine in packet, and instructions are distributed by the interface machine to the SCP on which the group is distributed. Here, as the interface machine is added specially to help the SMP to distribute various instructions to the SCP so as to perform uniform management for it, the resource consumption load of the SMP is reduced, and the efficiency of the system is improved.

Step three, when a user triggers an intelligent service through the SCP to which it belongs, the SCP perform the judging, the controlling and the billing for the on-net calls and the off-net calls.

In particular, an intelligent service is triggered by the subscription information of a group member in HLR, and the triggered SCP is the SCP to which the user belongs. The process for performing the judging, the controlling and the billing of the on-net calls and the off-net calls runs through the calling, the called and the forwarding procedures.

FIG. 3 is a flow diagram of the calling in the first embodiment of the present invention. The calling procedure, as shown in FIG. 3, comprises the following steps:

Step 1a, when a SCP receives a call, searching in the service database of this SCP to judge whether the calling user belongs to this SCP. If yes, after the number of the group which the calling user is in is acquired, then further judging whether the calling user calls a long number or a short number, if the long number is called, then executing step 2a, and if the short number is called, then executing step 3a; otherwise, executing step 4a;

Step 2a, searching for the called user in the service database of the SCP to which the calling user belongs according to the long number and the number of the group which the calling user is in, and judging whether the called user and the calling user are in the same group, if yes, executing step 5a, otherwise executing step 6a;

Step 3a, searching for the called user in the service database of the SCP to which the calling user belongs according to the short number and the number of the group which the calling user is in, and judging whether the called user and the calling user are in the same group, if yes, executing step 5a, otherwise executing step 6a;

Step 4a, the SCP directly transfers the call to MSC for processing, and no longer performs call control and call billing;

Step 5a, performing billing control and preferential billing according to the account balance of the calling user and the type of the call;

Step 6a, performing billing control and non-preferential billing according to the account balance of the calling user and the type of the call; the manner of how to perform billing control and preferential billing according to the account balance of the calling user and the type of the call can, but not limited to, be set by the mobile operators themselves.

Figure 4:
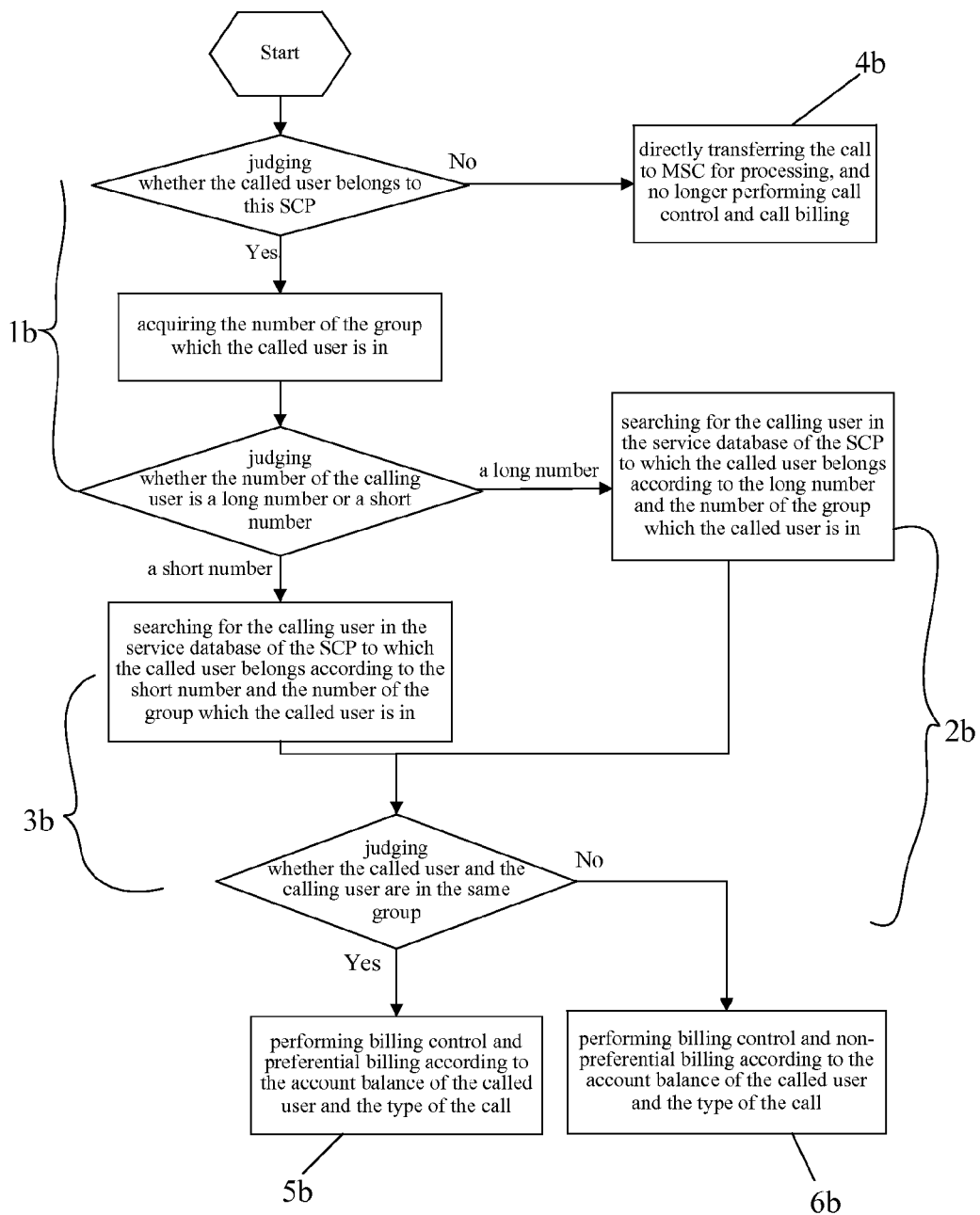
FIG. 4 is a flow diagram of the called in the first embodiment of the present invention.

FIG. 4 is a flow diagram of the called in the first embodiment of the present invention. The called procedure, as shown in FIG. 4, comprises the following steps:

Step 1b, when a SCP receives a call, searching in the service database of the SCP to judges whether the called user belongs to this SCP, if yes, after the number of the group which the called user is in has been acquired, then further judging whether the number of the calling user is a long number or a short number, if it is a long number, then executing step 2b, and if it is a short number, then executing step 3b; otherwise, executing step 4b;

Step 2b, searching for the calling user in the service database of the SCP to which the called user belongs according to the long number of the calling user and the number of the group which the called user is in, and judging whether the called user and the calling user are in the same group, if yes, then executing step 5b, otherwise executing step 6b;

Step 3b, searching for the calling user in the service database of the SCP to which the called user belongs according to the short number of the calling user and the number of the group which the called user is in, and judging whether the called user and the calling user are in the same group, if yes, then executing step 5b, otherwise executing step 6b;

Step 4b, the SCP directly transfers the call to MSC for processing, and no longer performs call control and call billing;

Step 5b, performing billing control and preferential billing according to the account balance of the called user and the type of the call;

Step 6b, performing billing control and non-preferential billing according to the account balance of the called user and the type of the call.

Figure 5:
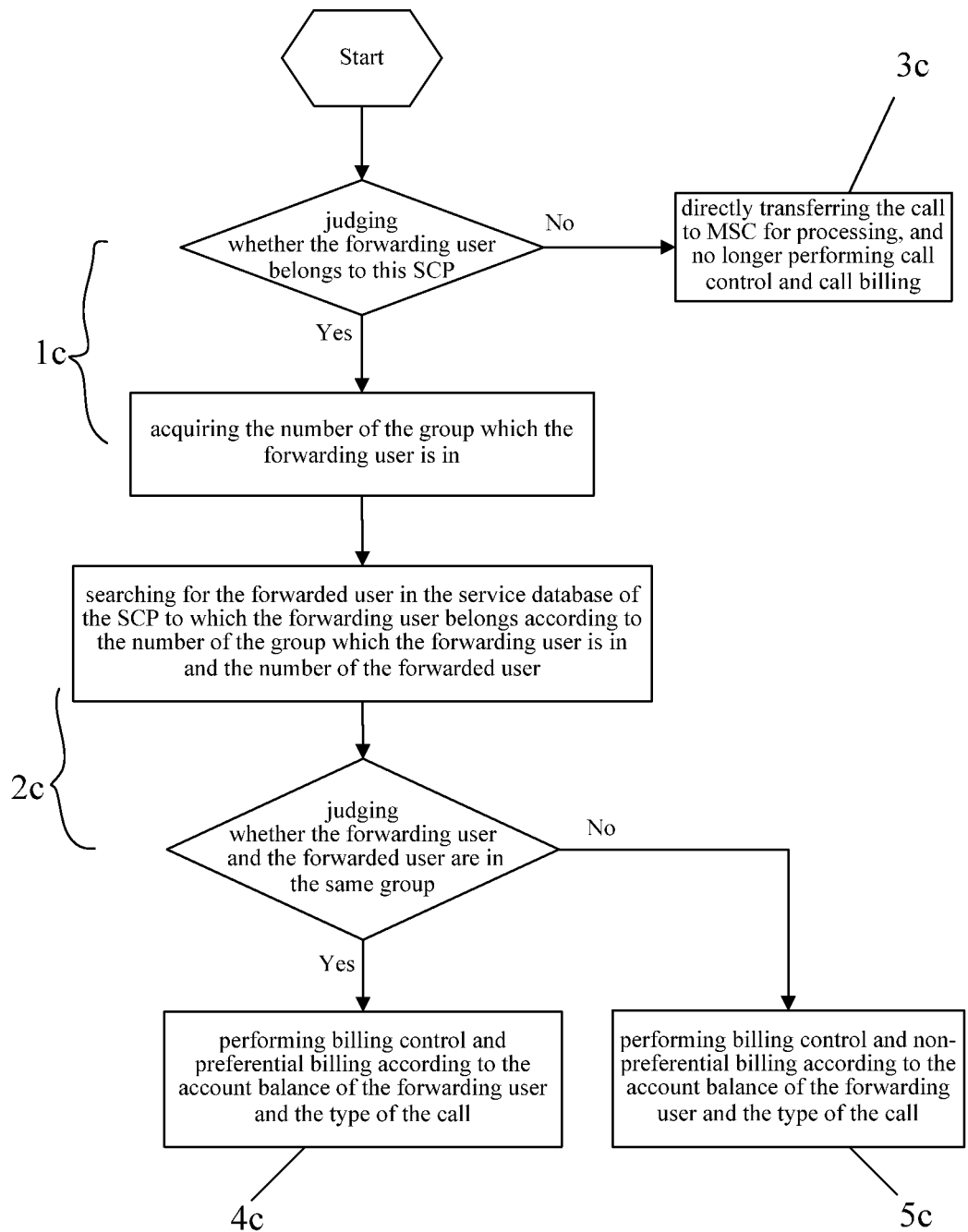
FIG. 5 is a flow diagram of the forwarding in the first embodiment of the present invention.

FIG. 5 is a flow diagram of the forwarding in the first embodiment of the present invention. The forwarding procedure, as shown in FIG. 5, comprises the following steps:

Step 1c, when a SCP receives a call, searching in the service database of the SCP to judge whether the forwarding user belongs to this SCP, if yes, after the number of the group which the forwarding user is in is acquired, executing step 2c, otherwise executing step 3c;

Step 2c, searching for the forwarded user in the service database of the SCP to which the forwarding user belongs according to the number of the group which the forwarding user is in and the number of the forwarded user, and judging whether the forwarding user and the forwarded user are in the same group, if yes, executing step 4c, otherwise executing step 5c; it should be noted that the forwarding service, as an intelligent service, is triggered by the subscription information of the group member in HLR, if a user needs to perform call forwarding, then its long number must be registered in the HLR subscription information. Therefore, the number of the forwarded user in step 2c refers to a long number;

Step 3c, the SCP directly transfers the call to MSC for processing, and no longer performs call control and call billing;

Step 4c, performing billing control and preferential billing according to the account balance of the forwarding user and the type of the call;

Step 5c, performing billing control and non-preferential billing according to the account balance of the forwarding user and the type of the call.

In the second embodiment of the present invention, in the situation where the group has the off-net number set, the difference between the method for implementing group intelligent service of a mobile virtual private network in this embodiment and that of the first embodiment lies in: that one field comprising information of the off-net number set corresponding to this group is added to the group's information when the group is established; besides, in step three, after the calling procedure judges that the calling user and the called user are not in the same group when an intelligent service is triggered by the group member through the SCP to which the group member belong, further judging whether the called user belongs to the off-net number set of the group which the calling user is in, so as to make a difference among the calls among on-net users, the calls between on-net users and users of the off-net number set, and the calls between on-net users and general off-net users for respectively performing call control and billing, and thus achieving different preferential billings.

Figure 6:
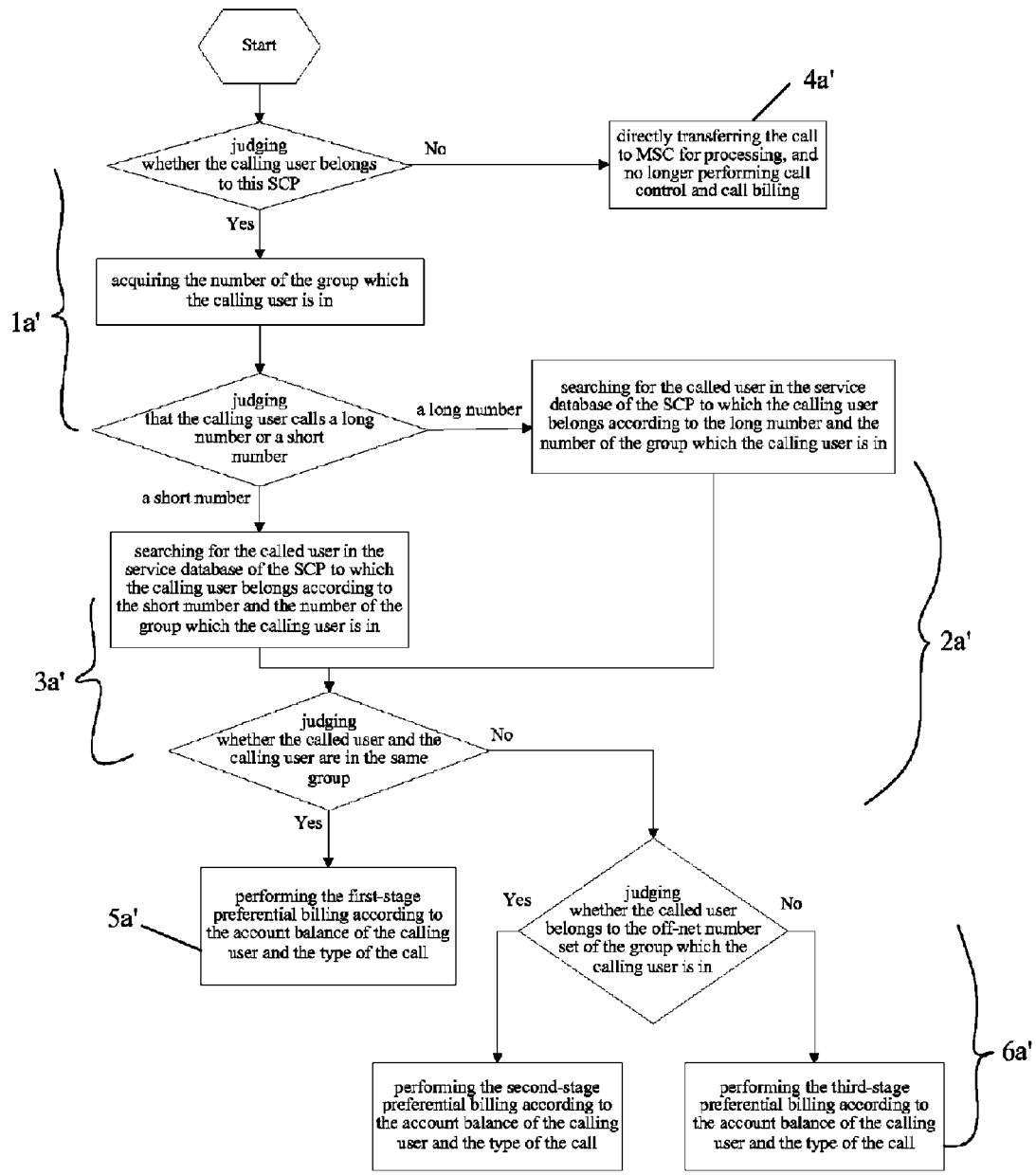
FIG. 6 is a flow diagram of the calling in the second embodiment of the present invention.

FIG. 6 is a flow diagram of the calling in the second embodiment of the present invention. The calling procedure as shown in FIG. 6 comprises the following steps:

Step 1a', when a SCP receives a call, searching in the service database of this SCP to judge whether the calling user belongs to this SCP, if yes, after the number of the group which the calling user is in has been acquired, then further judging that the calling user calls a long number or a short number of the called user, if the long number is called, then executing step 2a', and if the short number is called, then executing step 3a'; otherwise executing step 4a';

Step 2a', searching for the called user in the service database of the SCP to which the calling user belongs according to the long number and the number of the group which the calling user is in, and judging whether the called user and the calling user are in the same group, if yes, executing step 5a', otherwise executing step 6a';

Step 3a', searching for the called user in the service database of the SCP to which the calling user belongs according to the short number and the number of the group which the calling user is in, and judging whether the called user and the calling user are in the same group, if yes, executing step 5a', otherwise executing step 6a';

Step 4a', the SCP directly transfers the call to MSC for processing, and no longer performs call control and call billing;

Step 5a', performing the first-stage preferential billing according to the account balance of the calling user and the type of the call;

Step 6a', judging whether the called user belongs to the off-net number set of the group which the calling user is in, if yes, then performing the second-stage preferential billing according to the account balance of the calling user and the type of the call, otherwise, performing the third-stage preferential billing according to the account balance of the calling user and the type of the call. The manner of how to perform billing control and preferential billing according to the account balance of the calling user and the type of the call can, but not limited to, be set by the mobile operators themselves.

Figure 7:
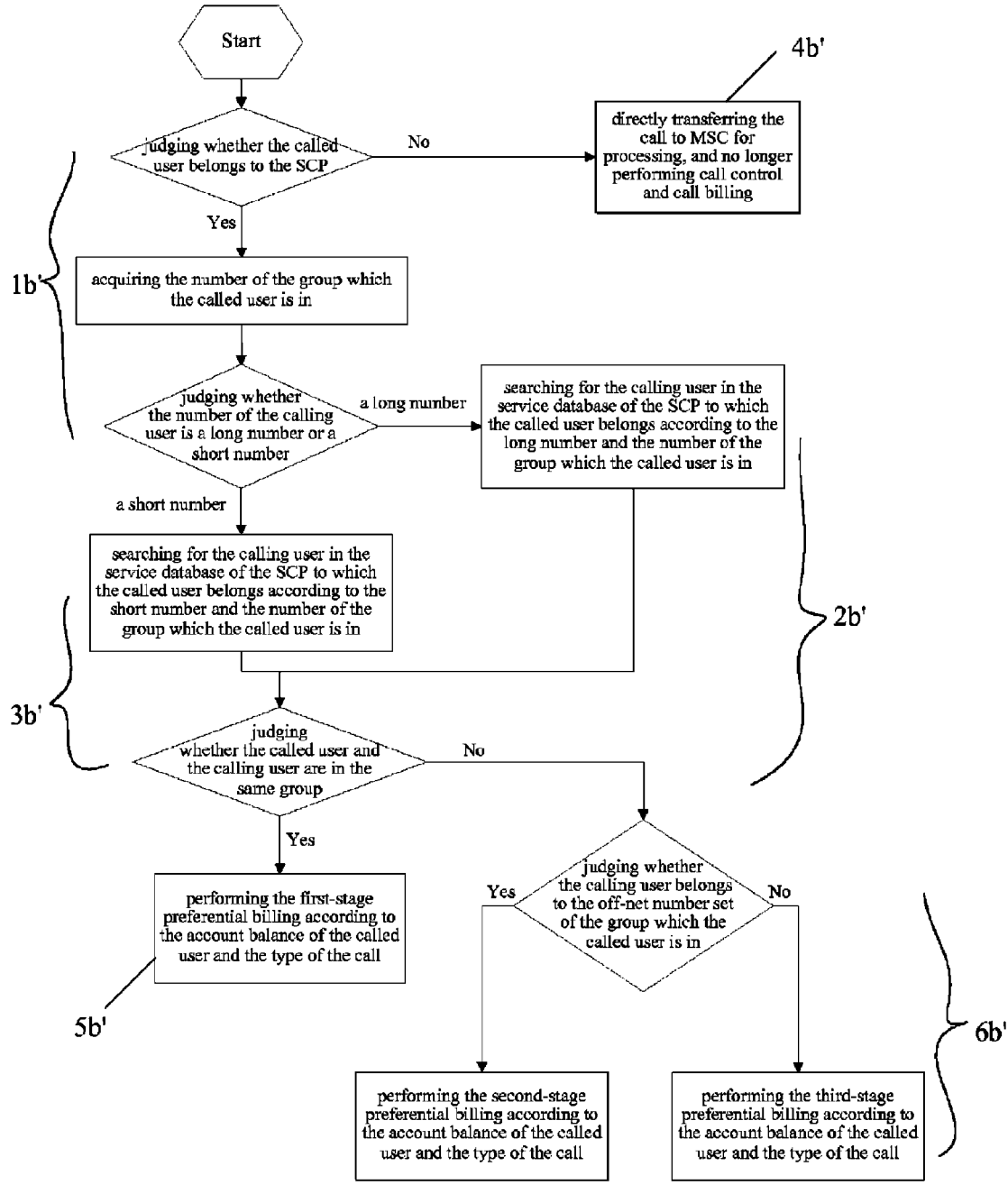
FIG. 7 is a flow diagram of the called in the second embodiment of the present invention.

FIG. 7 is a flow diagram of the called in the second embodiment of the present invention, said flow diagram of the called, as shown in FIG. 7, comprises the following steps:

Step 1b', when a SCP receives a call, searching in the service database of the SCP to judge whether the called user belongs to the SCP, if yes, further judging whether the number of the calling user is a long number or a short number after acquiring the number of the group which the called user is in, if it is a long number, then executing step 2b', if it is a short number, then executing step 3b'; otherwise executing step 4b';

Step 2b', searching for the calling user in the service database of the SCP to which the called user belongs according to the long number and the number of the group which the called user is in, and judging whether the called user and the calling user are in the same group, if yes, executing step 5b', otherwise executing step 6b';

Step 3b', searching for the calling user in the service database of the SCP to which the called user belongs according to the short number and the number of the group which the called user is in, and judging whether the called user and the calling user are in the same group, if yes, executing step 5b', otherwise executing step 6b';

Step 4b', the SCP directly transfers the call to MSC for processing, and no longer performs call control and call billing;

Step 5b', performing the first-stage preferential billing according to the account balance of the called user and the type of the call;

Step 6b', judging whether the calling user belongs to the off-net number set of the group which the called user is in, if yes, performing the second-stage preferential billing according to the account balance of the called user and the type of the call, otherwise performing the third-stage preferential billing according to the account balance of the called user and the type of the call. Particularly, the manner of how to perform billing control and preferential billing according to the account balance of the called user and the type of the call can, but not limited to, be set by the mobile operators themselves.

In the forwarding procedure, after judging that the forwarding user and the forwarded user do not belong to the same group, the present embodiment further judges whether the forwarded user belongs to the off-net number set of the group which the forwarding user is in, so as to make a difference in the forwarding procedure among three conditions i.e., the forwarding call between on-net users, the forwarding call from on-net users to general off-net users and the forwarding call from on-net users to the users of the off-net number set, for respectively performing call control and call billing, and thus achieving different preferential billings.

Figure 8:
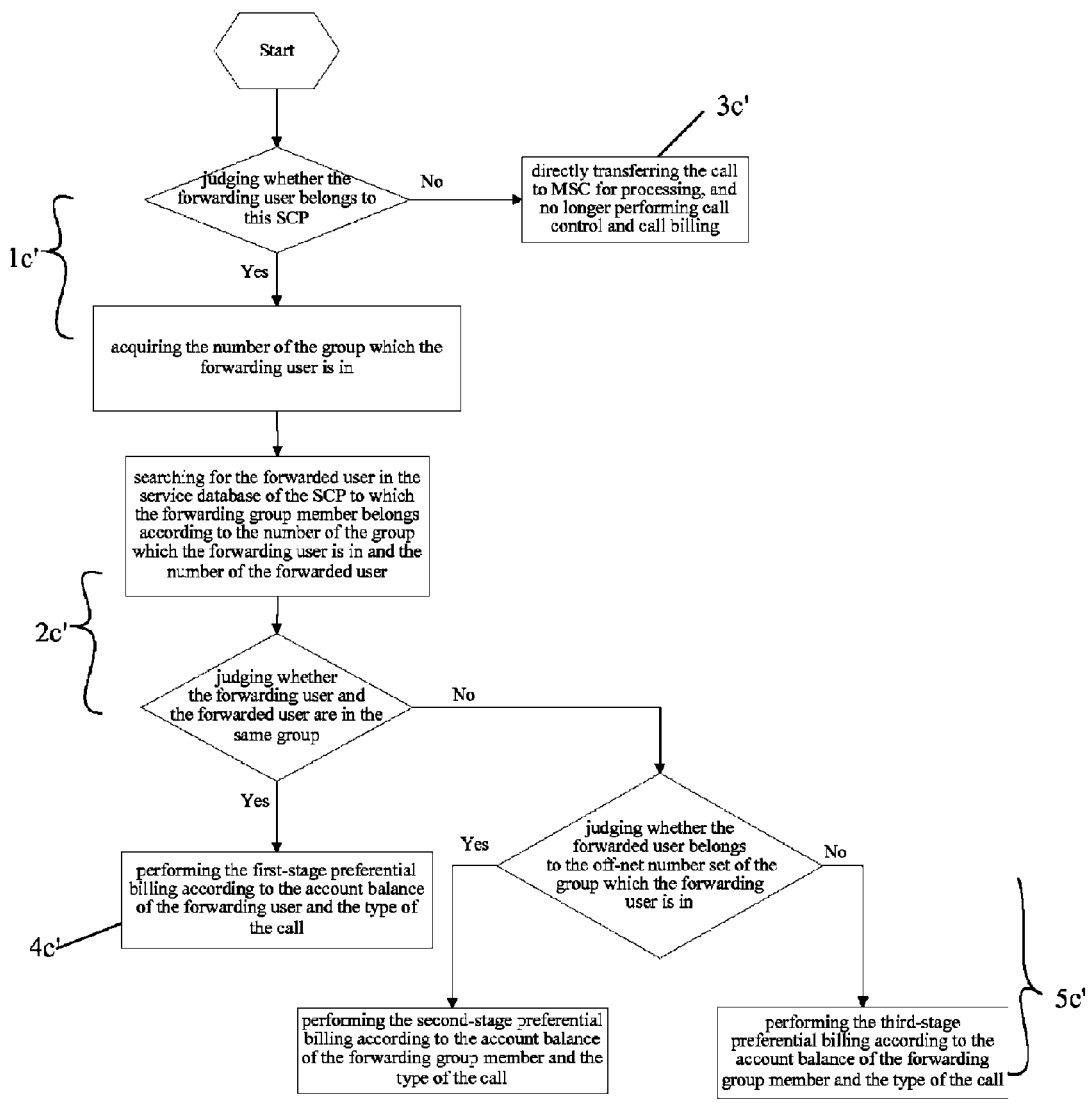
FIG. 8 is a flow diagram of the forwarding in the second embodiment of the present invention.

FIG. 8 is a flow diagram of the forwarding in the second embodiment of the present invention, said flow diagram of the forwarding, as shown in FIG. 8, comprises the following steps:

Step 1c', when a SCP receives a call, searching in the service database of the SCP to judge whether the forwarding user belongs to this SCP, if yes, after acquiring the number of the group which the forwarding user is in, executing step 2c', otherwise executing step 3c';

Step 2c', searching for the forwarded user in the service database of the SCP to which the forwarding group member belongs according to the number of the group which the forwarding user is in and the number of the forwarded user, and judging whether the forwarding user and the forwarded user are in the same group, if yes, executing step 4c', otherwise executing step 5c';

Step 3c', SCP directly transfers the call to MSC for processing, and no longer performs call control and call billing;

Step 4c', performing the first-stage preferential billing according to the account balance of the forwarding user and the type of the call;

Step 5c', judging whether the forwarded user belongs to the off-net number set of the group which the forwarding user is in, if yes, performing the second-stage preferential billing according to the account balance of the forwarding group member and the type of the call, otherwise performing the third-stage preferential billing according to the account balance of the forwarding group member and the type of the call.

In the third embodiment of the present invention, on condition that the group has on-net closed user set (group), the difference between the method for implementing group intelligent service of a mobile virtual private network in this embodiment and that in the first embodiment lies in: one field comprising information of the on-net closed user set corresponding to said group is added to the group's information when establishing the group; besides, in step three, when a user triggers an intelligent service through the SCP to which the user belongs, after the calling procedure and the called procedure judge that the calling user and the called user are in the same group, further judging whether the calling user and the called user belong to the same on-net closed user set, so as to make a difference among three conditions, i.e., the call between the on-net closed users, the call between general on-net users and the call between the on-net user and the off-net user, for respectively performing call control and call billing, and thus achieving different preferential billings.

Figure 9:
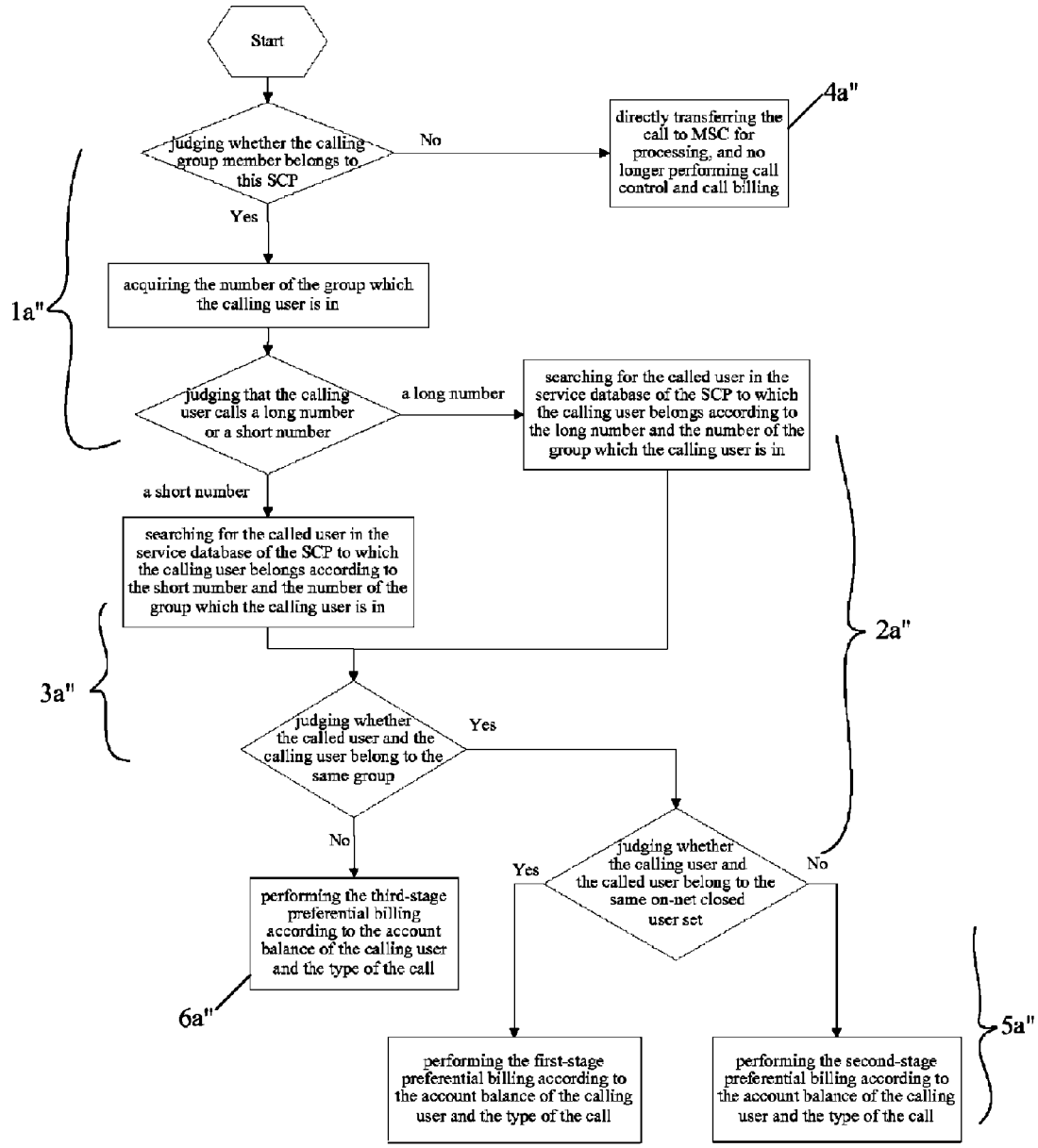
FIG. 9 is a flow diagram of the calling in the third embodiment of the present invention.

FIG. 9 is a flow diagram of the calling in the third embodiment of the present invention, said calling procedure, as shown in FIG. 9, comprises the following steps:

Step 1a", when a SCP receives a call, searching in the service database of the SCP to judge whether the calling user belongs to this SCP, if yes, further judging that the calling user calls a long number or a short number after acquiring the number of the group which the calling user is in, if it is a long number, then executing step 2a", if it is a short number, then executing step 3a"; otherwise executing step 4a";

Step 2a", searching for the called user in the service database of the SCP to which the calling user belongs according to the long number and the number of the group which the calling user is in, and judging whether the called user and the calling user belong to the same group, if yes, executing step 5a", otherwise executing step 6a";

Step 3a", searching for the called user in the service database of the SCP to which the calling user belongs according to the short number and the number of the group which the calling user is in, and judging whether the called user and the calling user belong to the same group, if yes, executing step 5a", otherwise executing step 6a";

Step 4a", the SCP directly transfers the call to MSC for processing, and no longer performs call control and call billing;

Step 5a", judging whether the calling user and the called user belong to the same on-net closed user set, if yes, performing the first-stage preferential billing according to the account balance of the calling user and the type of the call, otherwise performing the second-stage preferential billing according to the account balance of the calling user and the type of the call;

Step 6a", performing the third-stage preferential billing according to the account balance of the calling user and the type of the call. Particularly, the manner of how to perform billing control and preferential billing according to the account balance of the calling user and the type of the call can, but not limited to, be set by the mobile operators themselves.

Figure 10:
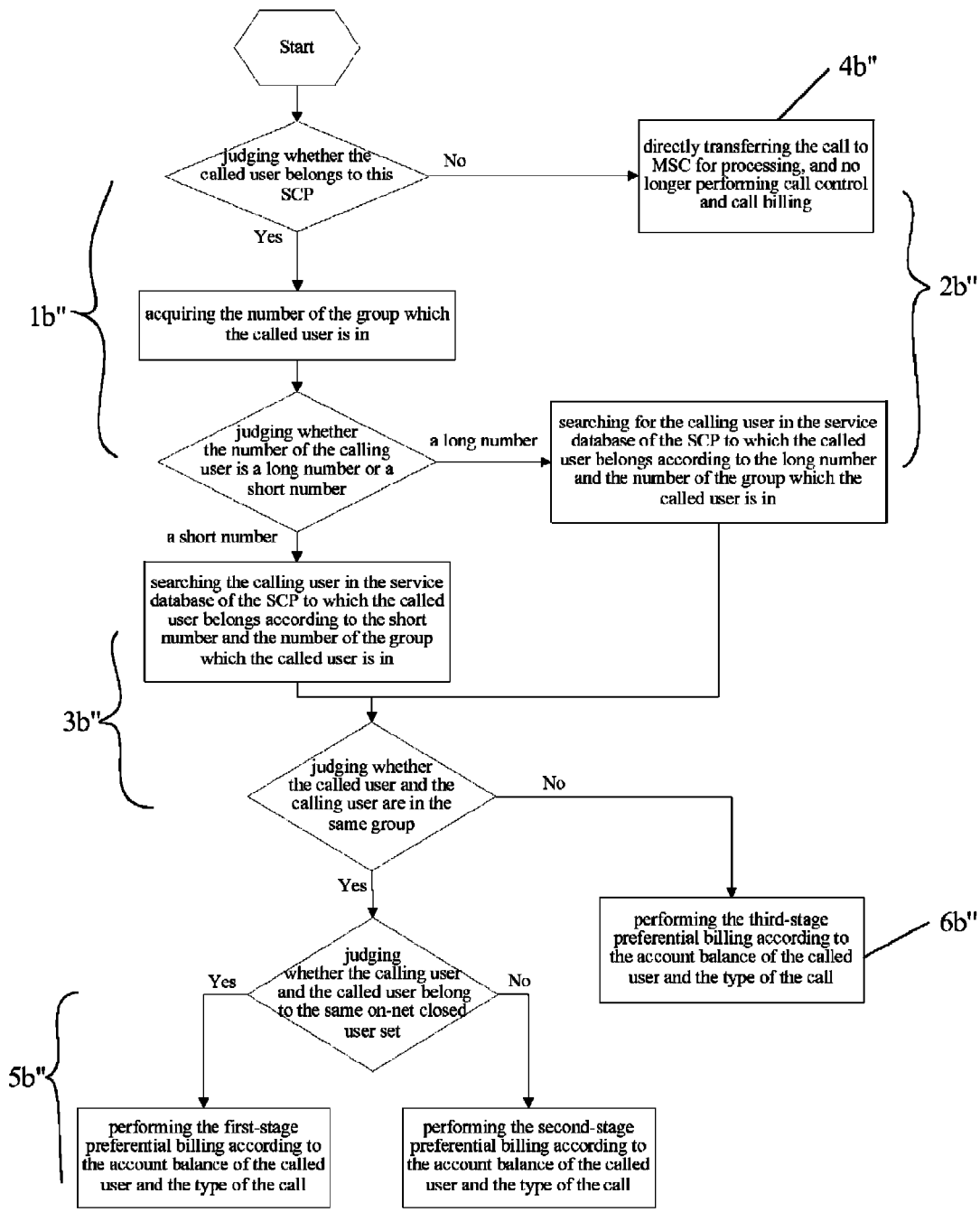
FIG. 10 is a flow diagram of the called in the third embodiment of the present invention.

FIG. 10 is a flow diagram of the called in the third embodiment of the present invention, said called procedure, as shown in FIG. 10, comprises the following steps:

Step 1b", when a SCP receives a call, searching in the service database of the SCP to judge whether the called user belongs to this SCP, if yes, further judging whether the number of the calling user is a long number or a short number after acquiring the number of the group which the called user is in, if it is a long number, then executing step 2b", if it is a short number, then executing step 3b"; otherwise executing step 4b";

Step 2b", searching for the calling user in the service database of the SCP to which the called user belongs according to the long number and the number of the group which the called user is in, and judging whether the called user and the calling user are in the same group, if yes, executing step 5b", otherwise executing step 6b";

Step 3b", searching the calling user in the service database of the SCP to which the called user belongs according to the short number and the number of the group which the called user is in, and judging whether the called user and the calling user are in the same group, if yes, then executing step 5b", otherwise executing step 6b";

Step 4b″, the SCP directly transfers the call to MSC for processing, and no longer performs call control and call billing;

Step 5b″, judging whether the calling user and the called user belong to the same on-net closed user set (group), if yes, performing the first-stage preferential billing according to the account balance of the called user and the type of the call, otherwise performing the second-stage preferential billing according to the account balance of the called user and the type of the call;

Step 6b″, performing the third-stage preferential billing according to the account balance of the called user and the type of the call.

In the forwarding process of the present embodiment, after judging whether the forwarding user and the forwarded user belong to the same group, further judging whether the forwarded user belongs to the same on-net closed user set of the forwarding user, so as to make a difference among three conditions in the forwarding procedure, wherein the three conditions includes the forwarding call between the users in the on-net closed user set, the forwarding call between the general on-net users and the forwarding call from on-net user to off-net user, for respectively performing call control and call billing, and thus achieving different preferential billings.

Figure 11:
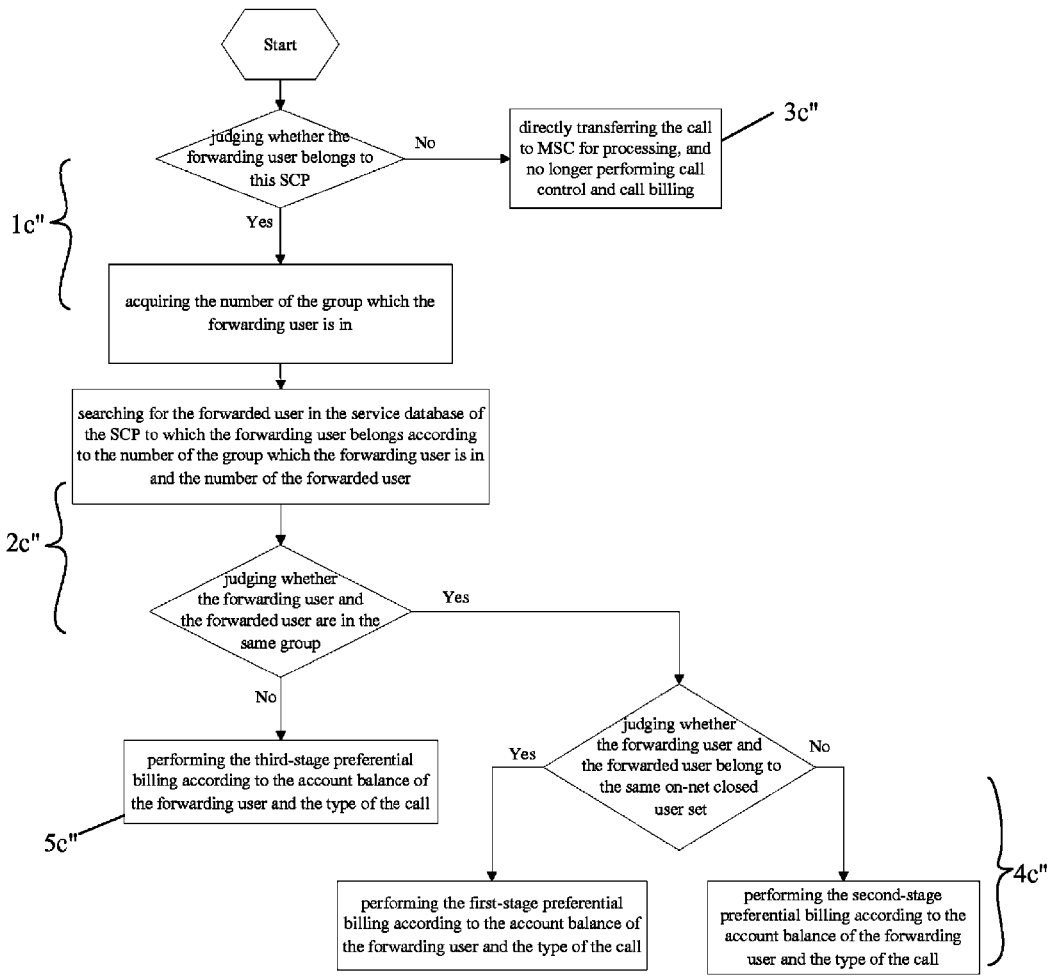
FIG. 11 is a flow diagram of the forwarding in the third embodiment of the present invention.

FIG. 11 is a flow diagram of the forwarding in the third embodiment of the present invention, said forwarding procedure, as shown in FIG. 11, comprises the following steps:

Step 1c″, when a SCP receives a call, searching in the service database of the SCP to judge whether the forwarding user belongs to this SCP, if yes, after acquiring the number of the group which the forwarding user is in, executing step 2c″, otherwise executing step 3c″;

Step 2c″, searching for the forwarded user in the service database of the SCP to which the forwarding user belongs according to the number of the group which the forwarding user is in and the number of the forwarded user, and judging whether the forwarding user and the forwarded user are in the same group, if yes, executing step 4c″, otherwise executing step 5c″; the number can be a long number or a short number;

Step 3c″, the SCP directly transfers the call to MSC for processing, and no longer performs call control and call billing;

Step 4c″, judging whether the forwarding user and the forwarded user belong to the same on-net closed user set (group), if yes, then performing the first-stage preferential billing according to the account balance of the forwarding user and the type of the call, otherwise performing the second-stage preferential billing according to the account balance of the forwarding user and the type of the call;

Step 5c″, performing the third-stage preferential billing according to the account balance of the forwarding user and the type of the call.

Figure 12:
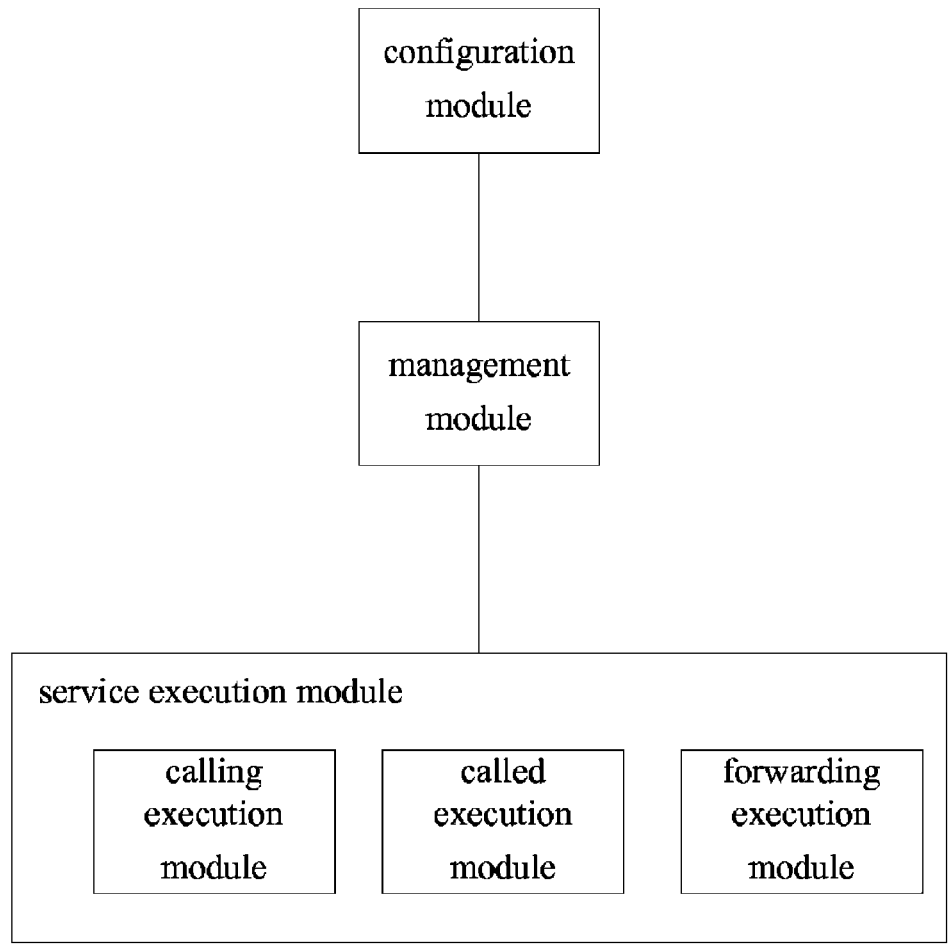
FIG. 12 is a schematic view of the device for implementing group intelligent service of a mobile virtual private network in the forth embodiment of the present invention.

FIG. 12 is a schematic view of the device for implementing group intelligent service of a mobile virtual private network in the forth embodiment of the present invention, as shown in FIG. 12, comprising:

a configuration module, used for configuring on a SMP a corresponding relationship between a group's number and the module number of the SCP(s) on which said group is distributed and configuring relevant data information of said group in the service database of each SCP on which said group is distributed;

the step of configuring relevant data information of the group refers to fill the service database of each SCP on which the group is distributed with relevant data information of the group on all SCPs on which the group is distributed, said relevant data information of the group comprising: group's information and information of group members; said information of group members includes the long number and short number of the group members, the call authority of the group members and the belonging information of the group members to the SCP; alternatively, said relevant data information of the group further comprises information of the off-net number set and the on-net closed user set of the group;

a management module, used for uniformly managing relevant data information of said group distributed on different SCPs; when relevant data information of the group is changed, successively sending instructions to the SCP on which the group is distributed according to the module number of the SCP or via an interface machine; then the SCP establishes and deletes the group, adds and deletes the group member, sets and modifies the short number of the group member, sets and modifies the call authority of the group member in the local database. Alternatively, the management module also can set and modify the information of the off-net number set and the closed user set (group) of the group. In practice, the management module can be one part of the SMP;

a service execution module, used for performing the judging, the controlling and the billing for the on-net calls and off-net calls when a user triggers a VPN intelligent service. The service execution module comprises a calling execution module, a called execution module and a forwarding execution module. In practice, the service execution module can be one part of the SCP.

Said calling execution module is used for judging whether the calling user belongs to this SCP; if said calling user belongs to the SCP, then further judging whether the called user and said calling user are in the same group, if yes, performing billing control and preferential billing according to the account balance of said calling user and the type of the call, otherwise, performing billing control and non-preferential billing according to the account balance of said calling user and the type of the call; if said calling user does not belong to said SCP, and directly transferring said call to MSC for processing, and no longer performing call control and call billing.

Said called execution module is used for judging whether the called user belongs to this SCP, if said called user belongs to the SCP, then further judging whether the called user and said calling user are in the same group, if yes, performing billing control and preferential billing according to the account balance of said called user and the type of the call, otherwise performing billing control and non-preferential billing according to the account balance of said called user and the type of the call; if said called user does not belong to said SCP, then directly transferring said call to MSC for processing, and no longer performing call control and call billing.

Said forwarding execution module is used for judging whether the forwarding user belongs to this SCP, if said forwarding user belongs to the SCP, then further judging whether said forwarding user and the forwarded user are in the same group, if yes, performing billing control and preferential billing according to the account balance of said forwarding user and the type of the call, otherwise performing billing control and non-preferential billing according to the account balance of said forwarding user and the type of the call; if said forwarding user does not belong to this SCP, then directly transferring said call to MSC for processing, and no longer performing call control and call billing.

The functions implemented by said calling execution module, said called execution module and said forwarding execution module described above in the present embodiment correspond to said calling procedure, said called procedure and said forwarding procedure of the first embodiment of the present invention. But the functions implemented by said calling execution module, said called execution module and said forwarding execution module of the present embodiment are not limited to correspond to the first embodiment, and also further correspond to said calling procedure, said called procedure and forwarding procedure of the second and third embodiment.

The embodiment of the present invention utilizes the SMP to manage a plurality of SCPs, thus guarantees the data synchronization among SCPs. The service is realized on each SCP on which cross-SCP MVPN group is distributed. One group's number is assigned for each group in the whole network, which uniquely identifying this group, such that the group's number is also unique on each SCP, however, it can exist in several SCPs in the whole network simultaneously. Various affairs of the group distributed on different SCPs are uniformly managed by the SMP, which thus guarantees the synchronization of the relevant data information of the group of each SCP on which the group is distributed. The method for implementing group intelligent service of a mobile virtual private network described in the embodiment of the present invention has marvelous function and is easy to be realized. Adopting the technical solution of the present invention can realize all service features of the MVPN group and is a perfect way to deal with the cross-SCP MVPN group, and has very high economic benefit.

By the description of specific embodiments, it can be understood more deeply and specifically for the technical method and effect of the present invention adopted for desired purposes. However, the accompanying drawings only provide reference and description and shall not be limitations to the present invention.

Apparently, those skilled in this art should understand, each foregoing module or each step of the present invention can be realized with general computing devices; they can be centralized on a single computing device or distributed in the network consisting of several computing devices; alternatively, they can be realized through program codes that can be executed by computing devices so that they can be stored in storage devices and executed by computing devices, or they can be manufactured as each integrated circuit module respectively, or several modules or steps of them can be manufactured as a single integrated circuit. In this way, the present invention is not limited to any particular combination of hardware or software.

The foregoing description is only preferred embodiments of the present invention and shall not be limitations to the present invention. Those skilled in the art should understand that the present invention can have various modifications and alternations. Any modification, equivalent replacement or improvement within the spirits and principles of the present invention shall belong to the protection scope of the present invention.

What is claimed is:

1. A method for implementing group intelligent service of a mobile virtual private network, comprising:
   configuring on a service management point, SMP, a corresponding relationship between a group's number and module number of service control points, SCPs, on which the group is distributed, and configuring relevant data information of the group in a service database of each SCP on which the group is distributed;
   uniformly managing relevant data information of the group distributed on different SCPs;
   performing judging, controlling, and billing for a call when a user triggers an intelligent service.

2. The method for implementing group intelligent service of a mobile virtual private network according to claim 1, wherein the step of uniformly managing the relevant data information of the group distributed on different SCPs comprises: updating and synchronizing the relevant data information of the group on the SCP on which the group is distributed when the relevant data information of the group is changed;
   wherein said relevant data information of the group comprises group's information and information of group members.

3. The method for implementing group intelligent service of a mobile virtual private network according to claim 2, wherein the step of updating and synchronizing the relevant data information of the group on the SCP on which the group is distributed comprises: sending instructions to relevant SCP successively by said SMP according to the module number of the SCPs on which the group is distributed or via an interface machine, updating said relevant data information of the group in a local database after said instructions are received by said relevant SCP;
   the step of updating said relevant data information of the group at least comprises one of the following: establishing and deleting a group, adding and deleting a group member, setting and modifying a short number of a group member, setting and modifying a calling authority of a group member.

4. The method for implementing group intelligent service of a mobile virtual private network according to claim 3, wherein the process for performing the judging, the controlling and the billing for the call runs through a calling procedure, a called procedure and a forwarding procedure.

5. The method for implementing group intelligent service of a mobile virtual private network according to claim 2, wherein the process for performing the judging, the controlling and the billing for the call runs through a calling procedure, a called procedure and a forwarding procedure.

6. The method for implementing group intelligent service of a mobile virtual private network according to claim 1, wherein the process for performing the judging, the controlling and the billing for the call runs through a calling procedure, a called procedure and a forwarding procedure.

7. The method for implementing group intelligent service of a mobile virtual private network according to claim 6, wherein said calling procedure comprises:
   when a SCP receives a call, judging whether the calling user belongs to said SCP, if said calling user belongs to said SCP, then further judging whether the called user and said calling user are in the same group, if yes, performing billing control and preferential billing according to account balance of said calling user and type of the call, otherwise, performing billing control and non-preferential billing according to the account balance of said calling user and the type of the call; if said calling user does not belong to said SCP, then directly transferring said call to MSC for processing, and no longer performing call control and call billing;
   said called procedure comprises:
   when a SCP receives a call, judging whether the called user belongs to said SCP, if said called user belongs to said SCP, then further judging whether said called user and the calling user are in the same group, if yes, performing billing control and preferential billing according to account balance of said called user and type of the call, otherwise performing billing control and non-preferential billing according to the account balance of said called user and the type of the call; if said called user does not belong to said SCP, then directly transferring the call to MSC for processing, and no longer performing call control and call billing;

said forwarding procedure comprises:

when a SCP receives a call, judging whether the forwarding user belongs to said SCP, if said forwarding user belongs to said SCP, then further judging whether said forwarding user and the forwarded user are in the same group, if yes, performing billing control and preferential billing according to account balance of said forwarding user and type of the call, otherwise performing billing control and non-preferential billing according to the account balance of said forwarding user and the type of the call; if said forwarding user does not belong to said SCP, then directly transferring said call to MSC for processing, and is no longer performing call control and call billing.

8. The method for implementing group intelligent service of a mobile virtual private network according to claim 6, wherein one field comprising information of an off-net number set corresponding to said group is added to said group's information, said calling procedure comprises the following steps:

when a SCP receives a call, judging whether the calling user belongs to this SCP, if said calling user belongs to this SCP, then further judging whether the called user and said calling user are in the same group, if yes, performing first-stage preferential billing according to account balance of said calling user and type of the call, otherwise further judging whether said called user belongs to the off-net number set of the group which said calling user belongs to, if yes, performing second-stage preferential billing according to the account balance of said calling user and the type of the call, otherwise performing third-stage preferential billing according to the account balance of said calling user and the type of the call; if said calling user does not belong to this SCP, then directly transferring said call to MSC for processing, and no longer performing call control and call billing;

said called procedure comprises the following steps:

when a SCP receives a call, judging whether the called user belongs to this SCP, if said called user belongs to said SCP, then further judging whether said called user and the calling user are in the same group, if yes, then performing first-stage preferential billing according to account balance of said called user and type of the call, otherwise further judging whether said calling user belongs to the off-net number set of the group which said called user belongs to, if yes, performing second-stage preferential billing according to the account balance of said called user and the type of the call, otherwise performing third-stage preferential billing according to the account balance of said called user and the type of the call; if said called user doesn't belong to said SCP, then directly transferring said call to MSC for processing, and no longer performing call control and call billing;

said forwarding procedure comprises:

when a SCP receives a call, judging whether the forwarding user belongs to this SCP, if said forwarding user belongs to said SCP, then further judging whether said forwarding user and the forwarded user are in the same group, if yes, performing first-stage preferential billing according to account balance of said forwarding user and type of the call, otherwise further judging whether said forwarded user belongs to the off-net number set, if yes, performing second-stage preferential billing according to the account balance of said forwarding user and the type of the call, otherwise performing third-stage preferential billing according to the account balance of said forwarding user and the type of the call; if said forwarding user does not belong to said SCP, then directly transferring the call to MSC for processing, and no longer performing call control and call billing.

9. The method for implementing group intelligent service of a mobile virtual private network according to claim 6, wherein one field comprising information of on-net closed user set corresponding to said group is added to said group's information, said calling procedure comprises the following steps:

when a SCP receives a call, judging whether the calling user belongs to this SCP, if said calling user belongs to said SCP, then further judging whether the called user and said calling user are in the same group, if yes, then further judging whether said calling user and said called user are in the same on-net closed user set, if yes, performing first-stage preferential billing according to account balance of said calling user and type of the call, otherwise performing second-stage preferential billing according to the account balance of said calling user and the type of the call; otherwise performing third-stage preferential billing according to the account balance of said calling user and the type of the call; if said calling user doesn't belong to said SCP, then directly transferring the call to MSC for processing, and no longer performing call control and call billing;

said called procedure comprises:

when a SCP receives a call, judging whether the called user belongs to this SCP, if said called user belongs to said SCP, then further judging whether said called user and the calling user are in the same group, if yes, then further judging whether said calling user and said called user are in the same on-net closed user set, if yes, then performing first-stage preferential billing according to account balance of said called user and type of the call, otherwise performing second-stage preferential billing according to the account balance of said called user and the type of the call; otherwise performing third-stage preferential billing according to the account balance of said called user and the type of the call; if said called user doesn't belong to said SCP, then directly transferring the call to MSC for processing, and no longer performing call control and call billing;

said forwarding procedure comprises:

when a SCP receives a call, judging whether the forwarding user belongs to this SCP, if said forwarding user belongs to said SCP, then further judging whether said forwarding user and the forwarded user are in the same group, if yes, further judging whether said forwarding user and said forwarded user are in the same on-net closed user set, if yes, performing first-stage preferential billing according to account balance of said forwarding user and type of the call, otherwise performing second-stage preferential billing according to the account balance of said forwarding user and the type of the call; otherwise performing third-stage preferential billing according to the account balance of said forwarding user and the type of the call; if said forwarding user doesn't belong to said SCP, then directly transferring the call to MSC for processing, and no longer performing call control and call billing.

10. A device for implementing group intelligent service of a mobile virtual private network, comprising:
- a first processor comprising logic circuitry, the first processor configured to configure on a SMP a corresponding relationship between a group's number and module number of service control points, SCPs, on which said group is distributed, and configure relevant data information of said group in a service database of each SCP on which said group is distributed;
- a second processor comprising logic circuitry, the second processor configured to uniformly manage relevant data information of said group distributed on different SCPs;
- a third processor comprising logic circuitry, the third processor configured to perform judging, controlling, and billing for a call when a user triggers an intelligent service.

11. The device for implementing group intelligent service of a mobile virtual private network according to claim 10, wherein the second processor uniformly manages the relevant data information of said group distributed on different SCPs by updating and synchronizing said relevant data information of said group on said SCP on which said group is distributed when said relevant data information of said group is changed;
said relevant data information of said group comprises: group's information and information of group members.

12. The device for implementing group intelligent service of a mobile virtual private network according to claim 11, wherein said third processor comprises a processor configured to perform calling execution, a processor configured to perform called execution, and a processor configured to perform forwarding execution.

13. The device for implementing group intelligent service of a mobile virtual private network according to claim 10, wherein said third processor comprises a processor configured to perform calling execution, a processor configured to perform called execution, and a processor configured to perform forwarding execution.

14. The device for implementing group intelligent service of a mobile virtual private network according to claim 10, wherein uniformly managing the relevant data information of said group distributed on different SCPs comprises updating and synchronizing said relevant data information of said group on said SCP on which said group is distributed when said relevant data information of said group is changed;
said relevant data information of said group comprises: group's information and information of group members.

15. A device for implementing group intelligent service of a mobile virtual private network, comprising at least one hardware processor configured to:
- configure on a SMP a corresponding relationship between a group's number and module number of service control points, SCPs, on which said group is distributed, and configure relevant data information of said group in a service database of each SCP on which said group is distributed;
- uniformly manage relevant data information of said group distributed on different SCPs; and
- perform judging, controlling, and billing for a call when a user triggers an intelligent service.

* * * * *

UNITED STATES PATENT AND TRADEMARK OFFICE
CERTIFICATE OF CORRECTION

PATENT NO. : 8,817,667 B2  
APPLICATION NO. : 13/322900  
DATED : August 26, 2014  
INVENTOR(S) : Zhirong Hou Page 1 of 1

It is certified that error appears in the above-identified patent and that said Letters Patent is hereby corrected as shown below:

In the Specification

In column 2 at line 43, change "a" to --an--. (2nd occurrence)

In column 5 at line 38, change "a" to --an--.

In column 6 at line 55, change "a" to --an--.

In column 13 at lines 8-9, change "can, but not limited to," to --can be, but need not be limited to being,--.

Signed and Sealed this  
Twenty-eighth Day of April, 2015

Michelle K. Lee  
*Director of the United States Patent and Trademark Office*